United States Patent [19]
Vance et al.

[11] Patent Number: 5,141,101
[45] Date of Patent: Aug. 25, 1992

[54] CONVEYOR BELT CONSTRUCTION

[75] Inventors: Douglas J. B. Vance, Daglish; William Johnson, North Beach, both of Australia

[73] Assignee: JLV Industries Pty Ltd, Myaree, Australia

[21] Appl. No.: 639,898

[22] Filed: Jan. 11, 1991

[30] Foreign Application Priority Data

Jan. 15, 1990 [AU] Australia .................. PJ8202

[51] Int. Cl.⁵ .................................. B65G 15/34
[52] U.S. Cl. ........................ 198/847; 198/821
[58] Field of Search ........... 198/847, 821, 818, 846, 198/820

[56] References Cited

U.S. PATENT DOCUMENTS

| | | | |
|---|---|---|---|
| 3,059,758 | 10/1962 | Walker | 198/847 |
| 3,900,627 | 8/1975 | Angioletti et al. | 198/847 X |
| 4,410,082 | 10/1983 | McGinnis | 198/847 X |
| 4,518,647 | 5/1985 | Morrison | 198/847 X |
| 5,004,098 | 4/1991 | Marshall | 198/847 |

FOREIGN PATENT DOCUMENTS

| | | |
|---|---|---|
| WO8101697 | 6/1981 | PCT Int'l Appl. |
| 711524 | 7/1954 | United Kingdom |
| 899237 | 6/1962 | United Kingdom |
| 1083536 | 9/1967 | United Kingdom |

Primary Examiner—Robert P. Olszewski
Assistant Examiner—Cheryl L. Gastineau
Attorney, Agent, or Firm—Harness, Dickey & Pierce

[57] ABSTRACT

A conveyor belt that is comprised of a body of elastomeric material with a reinforcing means disposed within the body to provide the belt with suitable transverse stiffness while maintaining longitudinal flexibility. The body comprises a core and top and bottom cover layers on opposed sides of the core. The reinforcement comprises a plurality of stiff elongated reinforcing elements incorporated in the body which extend transversely across the belt and which terminate inwardly of the longitudinal ends thereof. The reinforcing elements are spaced apart along the belt and include an arrangement for resisting transverse shrinkage of the elastomeric body.

5 Claims, 3 Drawing Sheets

CONVEYOR BELT CONSTRUCTION

BACKGROUND OF THE INVENTION

This invention relates to conveyor belts for conveyors of the type in which the conveyor belt is supported and driven by two endless cables, one adjacent each side of the belt. Such belt conveyors are commonly known as "cable belt conveyors" and hereinafter are referred to as belt conveyors of the type described.

Conveyor belts for belt conveyors of the type described are required to be relatively stiff transversely in order to support a load on the belt and relatively flexible longitudinally to permit the belt to pass around end rollers.

A common way to achieve the required transverse stiffness of the belt is to incorporate steel flat bar reinforcing straps in the belt. The straps are incorporated into the elastomeric body of the belt and extend transversely of the belt for almost the full width of the belt. The straps are at spaced intervals along the belt, the spacing being selected according to the desired deflection to be achieved when the belt is fully loaded. While this particular construction does provide the required transverse stiffness in the belt, it has not proved altogether satisfactory as the ends of the reinforcing straps have a tendency to protrude through the elastomeric body of the belt. This arises as a result of transverse shrinkage of the elastomeric material of the belt which occurs during exposure to the high temperature of vulcanisation and subsequent ambient temperature after the vulcanisation process is complete. As shrinkage occurs, the small cross-sectional area at the ends of the reinforcing straps exert concentrated compressive end loads on the elastomeric body with a result that the ends of the straps express their way through the elastomeric body and protrude from it. The protruding straps destroy the integrity of the belt surface and facilitate ingress of extraneous substances such as moisture which can have a damaging effect on the life of the belt.

With a view to overcoming the problems described above in relation to use of reinforcing straps, it has been proposed to reinforce the belt with a reinforcing structure comprising two layers of breaker fabric, one between each side of the elastomeric core of the belt and the adjacent cover layer. The breaker fabric has textile warps which provide longitudinal flexibility for the belt and steel cord wefts which provide lateral stiffness. This construction has also proved not to be altogether satisfactory as damage to one of the cover layers of the belt may expose the breaker fabrics to ingress of moisture which can cause the steel cords to corrode and so weaken the belt to the extent that it can collapse under load.

Against the background of the aforementioned difficulties with the construction of existing conveyor belting, the present invention seeks to provide a novel and useful alternative form of conveyor belt construction.

SUMMARY OF THE INVENTION

In one form the invention resides in a conveyor belt construction comprising a body of elastomeric material and reinforcing means disposed within the body to provide the belt with suitable transverse stiffness and longitudinal flexibility, said body comprising a core and top and bottom cover layers on opposed sides of the core, said reinforcing means comprising a plurality of stiff elongated reinforcing elements incorporated in said body, said reinforcing elements extending transversely across the belt and terminating inwardly of the longitudinal edges thereof, said elements being in spaced apart relation along the belt, said reinforcing means further comprising means for resisting transverse shrinkage of the elastomeric body.

Preferably, said means for resisting transverse shrinkage comprises a first reinforcing mesh disposed between said core and said bottom cover layer.

Preferably said reinforcing mesh is disposed below the neutral axis of said body.

Preferably, said reinforcing mesh is of woven construction having wefts which have greater axial compressive strength than the warps, said wefts extending transversely of the length of the belt. For preference the warps are formed from natural or artificial fibre cord and the wefts are formed of metallic cord or aramid fibre cord. It is important for the reinforcing mesh to have sufficient openness of weave to allow good adhesion between the elastomeric material and the mesh, and to permit penetration of the adhesive for good adhesion of adjoining elastomeric faces.

Preferably, said reinforcing elements are located in said core. To accomplish this, the reinforcing elements are preferably accommodated in recesses formed in the underside of the core.

Preferably, the reinforcing elements are in the form of steel flat bar straps. Preferably, such straps are coated with a material which both reduces likelihood of oxidisation and enhances the bonding properties of the strap to the surrounding position of the belt.

The reinforcing fabric does not add substantially to the stiffness of the belt but the wefts enhance the resistance to transverse shrinkage of the elastomeric body and so eliminates or at least reduces the likelihood of the reinforcing elements penetrating the exterior surface of the belt.

Preferably, said reinforcing means further comprises a second reinforcing mesh disposed between said core and said top cover layer.

It is important for the reinforcing mesh to have sufficient openness of weave to allow good adhesion between the elastomeric material and the mesh, and to permit penetration of the adhesive for good adhesion of adjoining elastomeric faces.

To improve the robustness of the longitudinal edges of the belt and to provide physical protection from mechanical damage caused by operational dislodgment of the belt in service, longitudinal marginal portions of said second reinforcing mesh are preferably wrapped around the longitudinal sides of said core.

BRIEF DESCRIPTION OF THE DRAWINGS

The invention will be better understood by reference to the following description of one specific embodiment thereof as shown in the accompanying drawings in which.

DESCRIPTION OF PREFERRED EMBODIMENT

Figure 1:
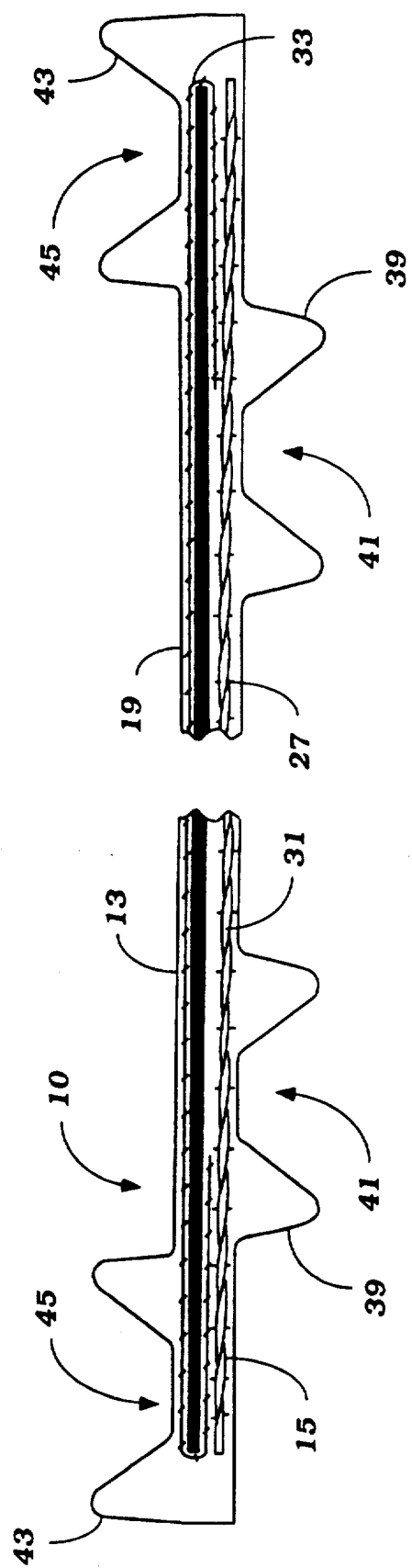
FIG. 1 is a cross-sectional view of a conveyor belt construction according to the embodiment.
Figure 2:
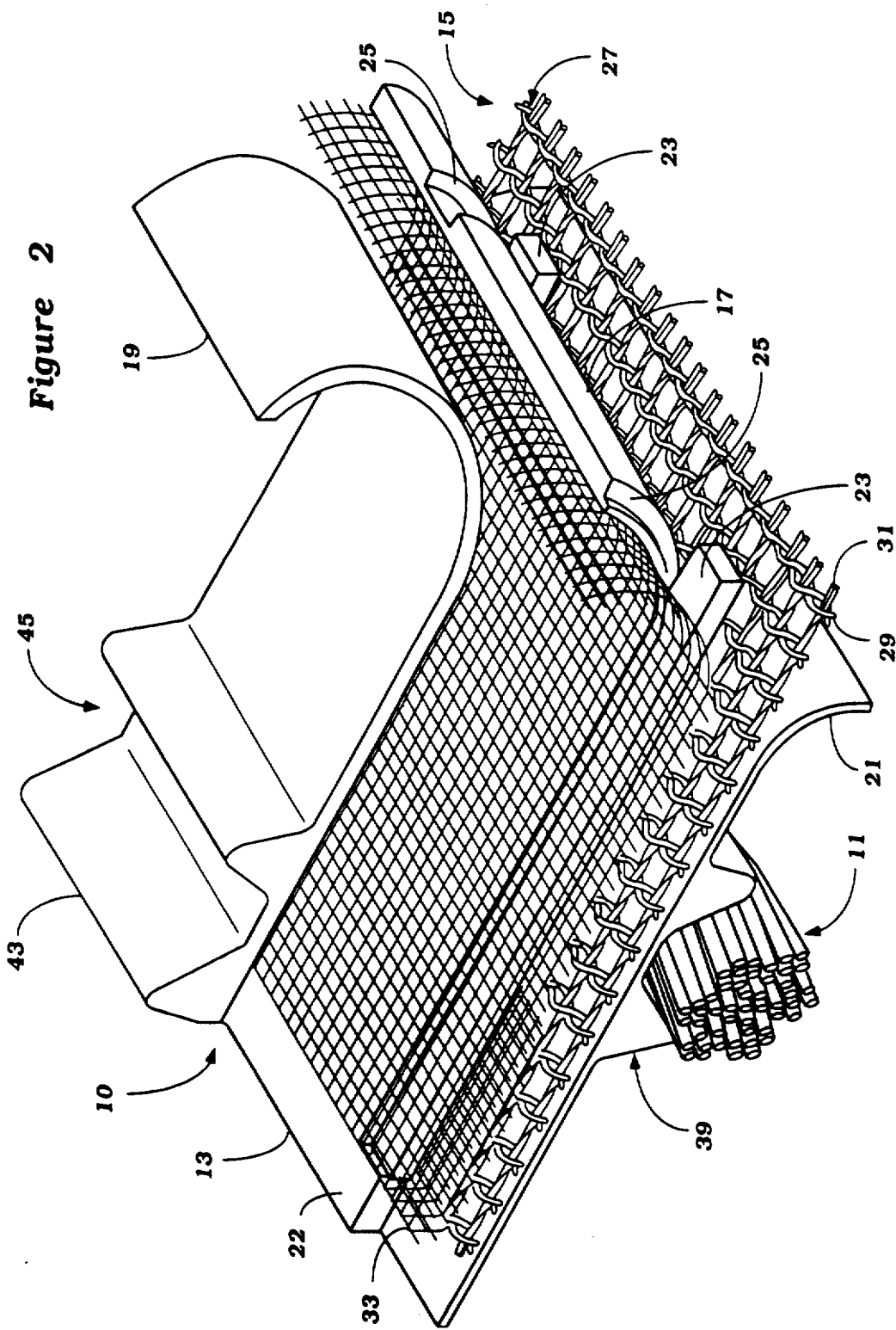
FIG. 2 is a schematic isometric view of the conveyor belt, with parts of the belt lifted to reveal its internal construction.

The embodiment shown in the drawings is directed to a conveyor belt 10 for use in a belt conveyor of the type in which the belt is supported and driven by two endless cables, one adjacent each side of the belt. One of the cables appears in FIG. 2 of the drawings and is identified by reference numeral 11.

The belt 10 comprises a body 13 of elastomeric material incorporating reinforcing means 15 to provide the belt with suitable transverse stiffness and longitudinal flexibility. The belt requires transverse stiffness so that it can be supported between the spaced cables 11 particularly while under load, and it requires longitudinal flexibility so that it can pass around end rollers of the conveyor with the endless cables.

The body 13 is of laminated construction, comprising a core 17 of elastomeric material and top and bottom cover layers 19 and 21 respectively each also of elastomeric material. The core 17 does not extend the full width of the belt so necessitating longitudinal edge strips 22. The top cover layer 19 provides the load carrying face of the conveyor belt.

The reinforcement means comprises a plurality of stiff elongated reinforcing elements 23 accommodated in recesses 25 in the core 17. The reinforcing elements extend transversely of the conveyor belt and terminate at the longitudinal edges of the core which is inwardly of the longitudinal sides of the belt. The reinforcing elements 23 are spaced along the belt at regular intervals according to the required stiffness of the belt. The reinforcing means in this embodiment are each in the form of steel flat bar straps coated with a bonding agent. The straps are produced in accordance with British Standard 970:Part 1:1972 or equivalent and are hardened and tempered to give a tensile strength within the range from 126 kg/mm$^2$ to 141.7 kg/mm$^2$.

The reinforcing means 15 further comprises a layer of first reinforcing mesh 27 disposed between the core 17 and the bottom cover layer 21 below the neutral axis of the body 13. The reinforcing mesh 27 is of woven construction comprising warps 29 of nylon cord and wefts 31 of either high tensile steel cord coated with brass or high tensile aramid fibre cord.

The wefts 31 have greater axial compressive strength than warps 29 and so serve to resist transverse shrinkage of the elastomeric body, as will be explained later.

The reinforcement means 15 further comprises a second reinforcing mesh 33 disposed between the core 17 and the top cover layer 19 above the neutral axis of the body 13. The reinforcing mesh 33 is a breaker fabric of woven construction comprising nylon warps and wefts.

Because of the characteristics of the material from which it is constructed, the second reinforcing mesh 33 is very flexible and does not serve to resist transverse shrinkage of the body 13 of the belt.

The first reinforcing mesh 27 and the second reinforcing mesh 33 are each woven with sufficient openness of weave to allow good adhesion between the elastomeric material of the core and adjacent cover layer, and to permit penetration for good adhesion between cover layer and the core.

For the purpose of improving the robustness of the edges of the belt and providing some physical protection from damage, the second reinforcing mesh 33 is wrapped around and under the longitudinal edges of the core 17. As a result of this, the longitudinal marginal edges of the reinforcing mesh 33 are disposed between the core 17 and bottom cover 21, above the first reinforcing mesh 27.

Shoes 39 are bonded to the underside of the bottom cover 21 to provide grooves 41 which receive the cables 11 during the load carrying run of the belt. Similarly shoes 43 are bonded to the upper covering to provide grooves 45 which receive the cables during the return run of the belt.

The various parts of the belt are bonded together by way of a vulcanising process performed in a vulcanising press. In the press, the parts are constrained between upper and lower dies and are subjected to heat and pressure in the conventional way. The press dies maintain the body in a flat condition so that a straight cross-sectional profile is produced.

Figure 3:
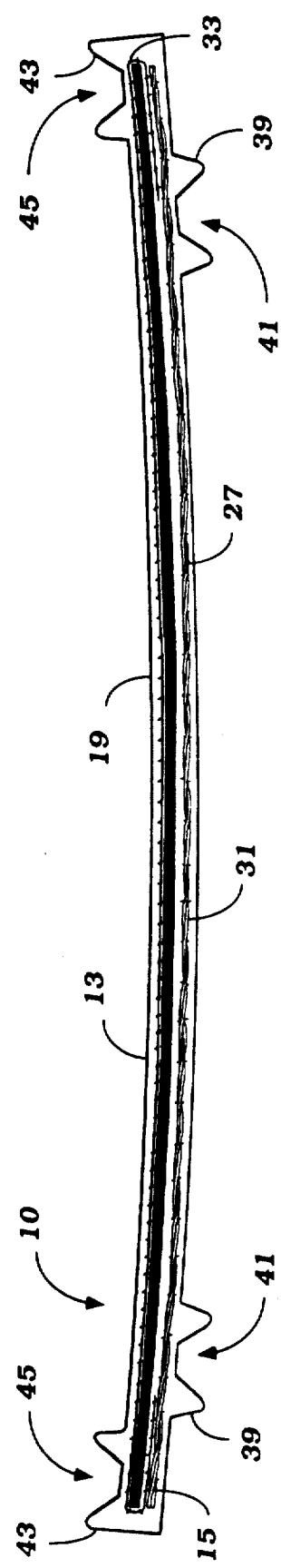
FIG. 3 is a cross-sectional view of a conveyor belt construction, taken across its full width, in accordance with the invention.

When the vulcanising process is complete, the belt is removed from the vulcanising press and allowed to cool to ambient temperature. As the belt cools, the top cover layer 19, which is not restrained against shrinkage by the reinforcing mesh 33, contracts laterally while the bottom cover layer 21, which is restrained against shrinkage by the reinforcing mesh 27, does not contract or at least contracts to a lesser extent. As a result of this, the belt assumes a profile which is concave on the top face, as shown in FIG. 3. The design stiffness remains unimpaired and the concave profile is desirable as it assists in preventing lateral migration and spillage of a load carried on the belt.

The desired concavity for such a belt can be engineered with variations being made to the thickness of core and the top and bottom covers.

Additionally, formation of a concave curvature in the belt may be assisted by forming a curvature in the reinforcing elements (as best seen in FIG. 3) prior to their insertion into the body of the belt.

The reinforcing elements 23 provide lateral stiffness for the belt and the first and second reinforcing meshes provide longitudinal flexibility and tensile strength and resistance to elongation. The weft 31 of the first reinforcing mesh 27 does not enhance the stiffness of the belt to any considerable extent but serves to provide resistance to transverse shrinkage of the elastomeric body 13 during high vulcanisation temperature and subsequent ambient temperatures to which the belt is exposed. This resistance to shrinkage eliminates or at least reduces the likelihood of the ends of the reinforcing elements protruding through the belt which would result in destruction of the integrity of the belt and so a reduction in its service life.

It should be appreciated that the scope of the invention is not limited to the scope of the embodiment described.

We claim:

1. A conveyor belt construction comprising a body of elastomeric material and reinforcing means disposed within the body to provide the belt with suitable transverse stiffness and longitudinal flexibility, said body comprising a core and top and bottom cover layers on opposed sides of the core, said reinforcement means comprising a plurality of stiff elongated reinforcing elements incorporated in said body, said reinforcing elements extending transversely across the belt and terminating inwardly of the longitudinal edges thereof, said elements being in spaced apart relation along the belt, said reinforcing means further comprising means for resisting transverse shrinkage of the elastomeric body; and wherein said means for resisting transverse shrinkage comprises a first reinforcing mesh disposed between said core and said bottom layer; and wherein said first reinforcing mesh is of woven construction having wefts which have greater axial compressive strength than the warps, said wefts extending transversely of the length of the belt.

2. A conveyor belt construction comprising a body of elastomeric material and reinforcing means disposed within the body to provide the belt with suitable transverse stiffness and longitudinal flexibility, said body comprising a core and top and bottom cover layers on opposed sides of the core, said reinforcement means comprising a plurality of stiff elongated reinforcing elements incorporated in said body, said reinforcing elements extending transversely across the belt and terminating inwardly of the longitudinal edges thereof, said elements being in spaced apart relation along the belt, said reinforcing means further comprising means for resisting transverse shrinkage of the elastomeric body; and wherein said reinforcing elements are located in said core; and wherein said reinforcing elements are accommodated in recesses formed in the underside of the core.

3. A conveyor belt construction according to claim 1 wherein said reinforcing means further comprises a second reinforcing mesh disposed between said core and said top cover layer, said second reinforcing mesh being of woven construction having wefts with lower axial compressive strength than the wefts of said first reinforcing mesh, said wefts of the second reinforcing mesh extending transversely of the length of the belt.

4. A conveyor belt construction comprising a body of elastomeric material and reinforcing means disposed within the body to provide the belt with suitable transverse stiffness and longitudinal flexibility, said body comprising a core and top and bottom cover layers on opposed sides of the core, said reinforcement means comprising a plurality of stiff elongated reinforcing elements incorporated in said body, said reinforcing elements extending transversely across the belt and terminating inwardly of the longitudinal edges thereof, said elements being in spaced apart relation along the belt, said reinforcing means further comprising means for resisting transverse shrinkage of the elastomeric body; and wherein said reinforcing elements have curvature formed therein prior to insertion into said body.

5. A conveyor belt construction comprising a body of elastomeric material and reinforcing means disposed within the body to provide the belt with suitable transverse stiffness and longitudinal flexibility, said body comprising a core and top and bottom cover layers on opposed sides of the core, said reinforcement means comprising a plurality of stiff elongated reinforcing elements incorporated in said body, said reinforcing elements extending transversely across the belt and terminating inwardly of the longitudinal edges thereof, said elements being in spaced apart relation along the belt, said reinforcing means further comprising means for resisting transverse shrinkage of the elastomeric body; and wherein said means for resisting transverse shrinkage comprises a first reinforcing mesh disposed between said core and one of said top and bottom cover layers; and wherein said first reinforcing mesh is of woven construction having wefts which have greater axial compressive strength than the warps, said wefts extending transversely of the length of the belt.

* * * * *